Jan. 13, 1959  S. M. PHELPS  2,868,534
WEIGHT DETECTOR FOR RAILWAY CARS
Filed Oct. 14, 1953  4 Sheets-Sheet 1

INVENTOR.
S.M. PHELPS
BY
Forest B. Hitchcock
HIS ATTORNEY

Jan. 13, 1959  S. M. PHELPS  2,868,534
WEIGHT DETECTOR FOR RAILWAY CARS
Filed Oct. 14, 1953  4 Sheets-Sheet 2

INVENTOR.
S.M.PHELPS
BY
HIS ATTORNEY

Jan. 13, 1959   S. M. PHELPS   2,868,534
WEIGHT DETECTOR FOR RAILWAY CARS
Filed Oct. 14, 1953   4 Sheets-Sheet 3

INVENTOR.
S. M. PHELPS
BY
*Forest B. Hitchcock*
HIS ATTORNEY

Jan. 13, 1959  S. M. PHELPS  2,868,534
WEIGHT DETECTOR FOR RAILWAY CARS
Filed Oct. 14, 1953  4 Sheets-Sheet 4

INVENTOR.
S.M.PHELPS
BY
HIS ATTORNEY

United States Patent Office 2,868,534
Patented Jan. 13, 1959

2,868,534
WEIGHT DETECTOR FOR RAILWAY CARS

Stuart M. Phelps, Rochester, N. Y., assignor to General Railway Signal Company, Rochester, N. Y.

Application October 14, 1953, Serial No. 386,095

2 Claims. (Cl. 265—63)

This invention relates to weight detectors, and more particularly pertains to a weight sensitive rail contactor for use in a railway classification yard to determine the weight of a car so that the proper amount of braking can be applied by the car retarders as the car passes to a certain designated track.

In systems for car classification yards wherein the speed of the rolling cars is controlled by track brakes or car retarders, it is necessary to know the approximate weight of each car being classified. This weight information is then utilized to precondition the braking effect of the car retarders so that the speed of the classified cars will be properly controlled until they reach their destination track. When the setting of the car retarders is effected manually, the weight information can be obtained from car records; but when the car retarders are to be automatically controlled, it becomes necessary to have some means of indicating the car weights for the respective cars as they successively reach the car retarders.

The present invention proposes to provide means to obtain these car weight estimates for an automatic retarder control system which means comprises a detector device located along the side of one of the rails and being so situated that each car wheel on one side of a moving car will pass over and depress a spring biased articulated treadle which cooperates through a lever arm and shaft arrangement to operate the cams of a circuit controller. The cams when operated will close certain pairs of electrical contacts and each pair of contacts requires a different degree of cam movement to make contact. The amount the treadle is depressed will be determined by the wheel load of the particular car wheel passing thereover. If the wheel load of the various car wheels varies, the amount of treadle depression and cam movement will also vary and consequently, the circuit controller contacts associated with the car wheel indicating the greatest wheel load may be selected by the automatic retarder control system to govern the amount of braking effect applied to the car wheels by the car retarders.

In a modified form of the invention, a single treadle is depressed at one end which comprises a spring and operates a dash-pot device to delay the return of the treadle after the wheel load has been removed. The treadle also operates a spring biased plunger which in turn operates electrical contacts which indicate the wheel load.

One object of the invention is to provide a simple weight detector which will automatically indicate the approximate weight of a car passing thereover.

Another object of the invention is to provide a means whereby the return of the treadle to its normal position by the trapped spring pressure resulting from the wheel load on the treadle will be retarded to prevent undue shocks upon the passage of successive wheels of a car.

Other objects, purposes and characteristic features of the invention will be pointed out as the description of the device progresses and reference will be made to the accompanying drawings in which.

Figure 1:
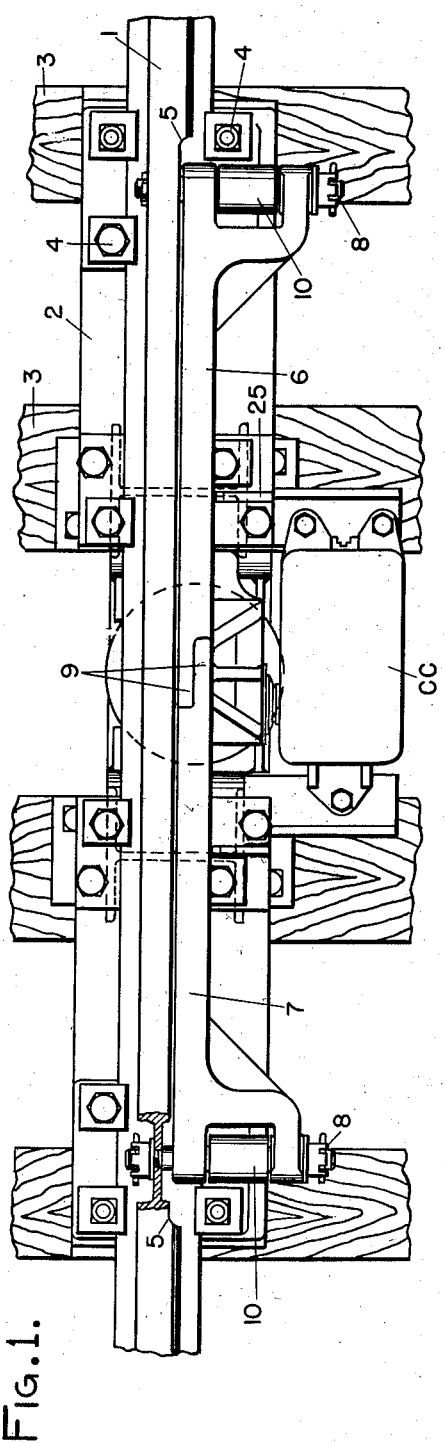
Fig. 1 is a top elevation view of one railroad rail and the weight detector with an articulated two arm treadle shown applied thereto.
Figure 2:
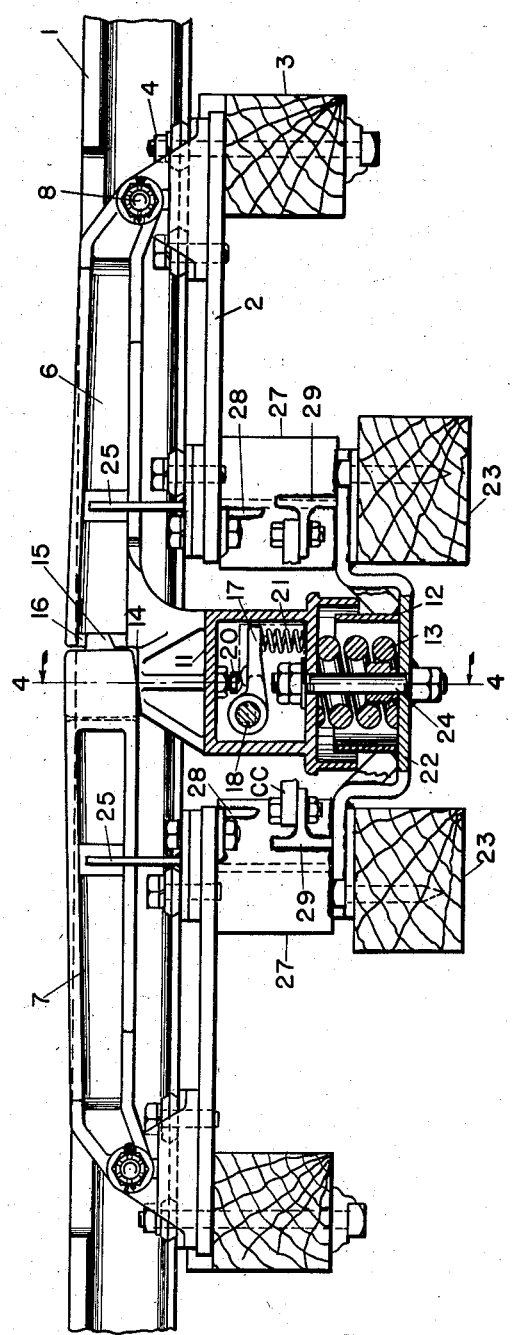
Fig. 2 is a side elevation view partly in section showing the relation of the weight detector and the rail.
Figure 3:
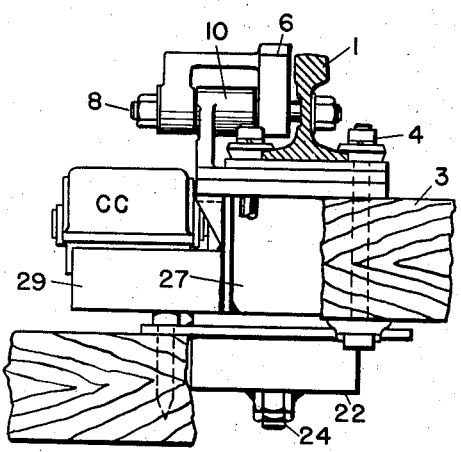
Fig. 3 is an end view of the above two views.
Figure 4:
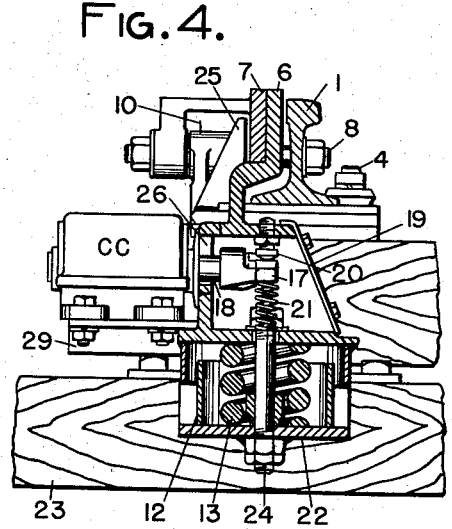
Fig. 4 is a sectional view taken on the line 4—4 of Fig. 2.

Two forms that the invention may assume are shown in the drawings and reference thereto will be made by reference characters with like parts being referred thereto by like reference characters. Referring now to the first and most simple form of the invention as shown in Figs. 1 to 6 inclusive, there has been shown one rail 1 of an ordinary railroad track, the rail 1 resting on tie plates 2 which in turn are located on wooden ties 3, the rail 1, plates 2 and ties 3 being bolted together by bolts 4 to secure the rail 1. The rail 1 is cut away along the outside edge of the rail head as shown at 5 to provide space for the articulated treadle 6—7 of the weight detector device. The treadle is comprised of two parts 6 and 7, each having their outer ends pivotally mounted on a bolt 8. The inner ends are articulated and overlap each other as shown at 9. The pivot bolts 8 are anchored at their inner ends to the mid-section of the rail 1 and pass through holes in bearing brackets 10 which act as supports and keep the bolts 8 in alignment. These bearing brackets 10 are secured to the tie plates 2 by the bolts 4 passing therethrough.

The right half 6 of the articulated treadle has formed thereon a downwardly projecting housing 11 which telescopes another housing 12, a compression spring 13 being inserted therebetween. The left half 7 of the articulated treadle rests on a flat portion 14 of the housing 11 and has a lug 15 which extends into a jaw portion 16 in the right treadle part 6, thus forming an articulated coupling between the two treadle parts 6 and 7. The compression spring 13 biases the center portion of the treadle 6—7 to an upward position so that it protrudes above the head of the rail 1, thus forming inclines on the top surface of the articulated treadle, these inclines sloping towards the pivoted ends of the treadle parts 6 and 7.

Located within the housing portion 11 of the treadle part 6 is a crank arm 17 which is fastened to a shaft 18, this shaft 18 extending from a circuit controller device CC through an elongated hole 26 into the housing portion 11. The crank arm 17 is biased upward against an adjustable stop screw 20 by a compression spring 21. An opening in the housing 11 is covered by a plate 19. The lower housing 12 is welded to a support bracket 22 which is suitably supported on a pair of auxiliary ties and tie plates 23. A tie bolt 24 passes through the two housings 11 and 12 and holds them together against the outward force of the compression spring 13. This arrangement allows the two housings to be adjustably spaced from each other and determines the distance that the treadle protrudes above the surface of the head of the rail 1. Guide bars 25 are welded to the tie plates 2 and project upwardly to act as vertical guides for the treadle 6—7 and also to prevent any horizontal movement of the treadle.

The two tie plate assemblies 2 and the support bracket 22 are fastened together to form one complete U-shaped supporting structure, by means of plates 27, angle supports 28 and T beams 29, all welded together as shown. The circuit controller CC is supported by, and bolted to, the two T beams 29.

From the foregoing description, it should be readily apparent that the top inclined surface of the treadle assembly lies partially within the cut away portion 5 of the rail head so that, when a moving car reaches the treadle assembly the wheel tread will leave the rail head and ride upon the inclined hump of the treadle assembly and the amount of distance the treadle is depressed at its center section will depend upon the reaction of the weight of the car against the force exerted by the compression spring 13. As the treadle is depressed the housing 11 and its associated stop screw 20 will depress the crank arm 17 and spring 21 a like amount of distance which results in a clockwise turning motion of the shaft 18.

As previously mentioned, this shaft 18 is part of a circuit controlling device CC which may be of any type of suitable structure, but for convenience there has been chosen a circuit controller of the type commonly used in railway practice as shown, described and claimed in the prior patent to J. E. Stephenson, No. 2,394,215, dated February 5, 1946.

Figure 5:
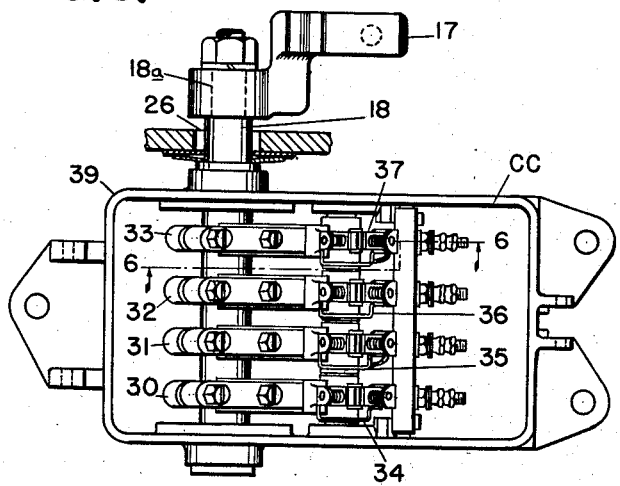
Fig. 5 is a top view of the circuit controller which is operated by the weight detector device.
Figure 6:
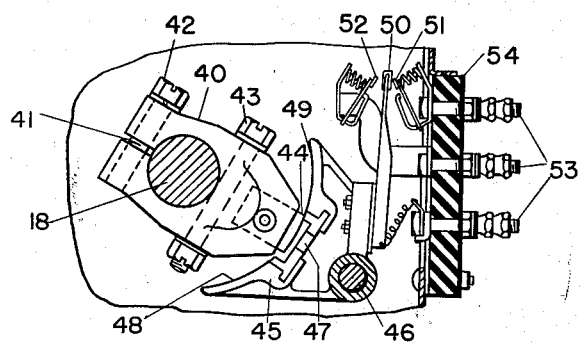
Fig. 6 is a sectional view of the cam and contacts of the circuit controller taken substantially on the line 6—6 of Fig. 5.
Figure 7:
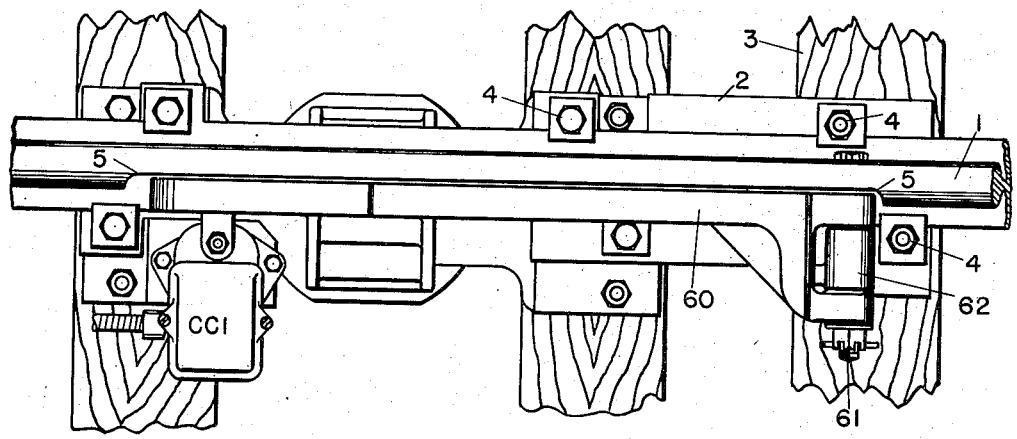
Fig. 7 is a top elevation view of a rail and a single arm treadle type weight detector including a dash-pot arrangement for controlling the treadle return to normal.
Figure 8:
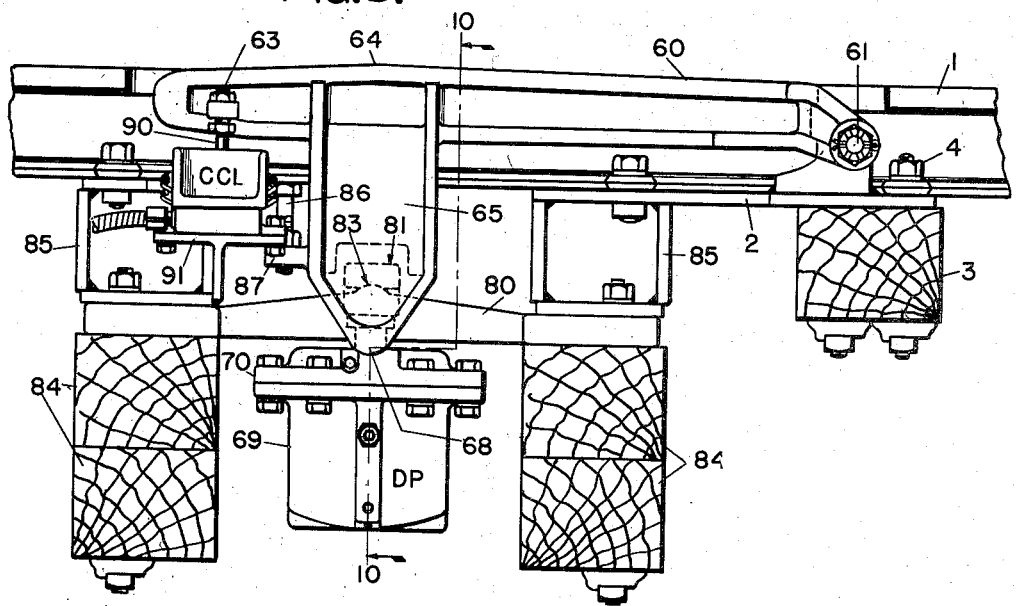
Fig. 8 is a side elevation view of the apparatus shown in Fig. 7.
Figure 9:
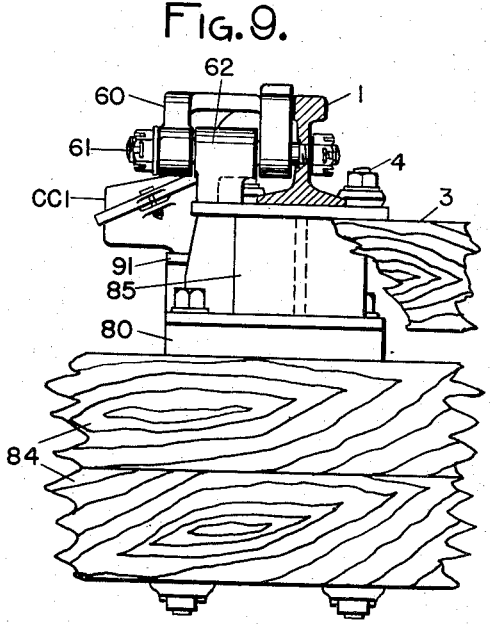
Fig. 9 is an end view of the same apparatus.
Figure 10:
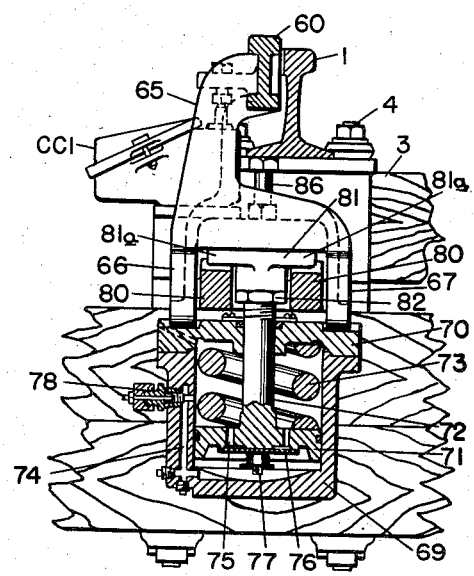
Fig. 10 is a sectional view taken on the line 10—10 of Fig. 8.

Such a circuit controller CC has been partially shown in Figs. 5 and 6 and the crank arm 17 has been shown as attached to the shaft 18 thereof, the crank arm 17 fitting over a squared section 18a on the shaft 18 and being held in place by a nut and lock washer. Briefly described, the shaft 18 passes through the circuit controller housing 39 and has a series of cam members adjustably mounted thereon within the housing. For the purpose of illustration, four such cam members 30, 31, 32 and 33 have been shown, each cam member cooperating with and operating a contact member when the shaft 18 is turned, such contact members being designated 34, 35, 36 and 37. The housing 39 is covered and sealed against moisture by a suitable covering.

Each cam member 30—33 (see Fig. 6) comprises a body portion 40 having a hole therein slightly larger than shaft 18 so that it may slide loosely over the shaft. The body portion 40 is slotted as shown at 41 and a lock screw 42 is threaded transversely through the split portion and is used to lock the cam in place on the shaft 18. Another screw or bolt 43 passes transversely through the body portion 40 and cooperates with threads (not shown) on the shaft 18 for the purpose of adjusting the cam member with respect to the shaft 18, in an arcuate direction. A hardened insert 44 protrudes from the body portion 40 and is adapted to cooperate with an associated contact member to operate the contacts.

Each contact member 34—37 comprises a rocker arm 45 which is pivoted on a shaft 46. This rocker arm cooperates with the hardened insert 44 of the cam member and is formed with a shouldered groove 47 and two cam surfaces 48 and 49 on its outer face. A movable contact finger 50 is fastened to and insulated from the rocker arm 45 and is adapted to be moved between two stationary contacts 51 and 52. Each of the contacts 50, 51, and 52 is fastened to, or electrically connected to, binding posts 53 which are located in a terminal board 54.

As previously mentioned, the cam members 30—33 are adjustably mounted on the shaft 18 and in the particular adaptation herein shown, it is proposed to have each of the four cam members 30—33 adjusted for different amounts of operating movement. As shown in Fig. 6 of the drawings, cam member 33 is adjusted for a minimum of operating movement of approximately two degrees. In other words, two degrees of arcuate movement in a clockwise direction of shaft 18 would cause the cam insert piece 44 to strike the left hand shoulder of the groove 47 in the contact rocker arm 45 and rock it on its pivot shaft 46. The cam piece 44 then rides flush on the cam surface 48 to hold the rocker arm 45 in its tilted position. As the movable contact finger 50 is fastened to the rocker arm 45, the tilting movement of this rocker arm 45 will break the electrical connection between contacts 50 and 51 and make a connection between contacts 50 and 52. When the shaft 18 is moved in a reverse direction, the cam piece 44 will leave the cam surface 48 and strike the right hand shoulder of the groove 47 and rock the rocker arm 45 back to its normal position, the cam piece 44 riding flush on the cam surface 49 as shown, with the movable contact finger 50 again making contact with stationary contact 51.

For the purpose of illustrating the use of the circuit controller CC in connection with the invention, it has already been assumed that the cam member 33 must be rotated approximately two degrees to operate its associated contact member 37. Let us now assume that cam member 32 is adjusted to operate its associated contact member 36 upon four degrees of arcuate movement, cam member 31 on 6 degrees and cam member 30 on 8 degrees. As the clockwise rotation of shaft 18 is caused by depressing the articulated treadle 6—7, it is obvious that the more weight placed on the treadle the more the shaft 18 would rotate.

In the present illustration, cam member 33 and its associated contact member 37 would indicate the minimum weight while cam member 30 would indicate the maximum weight, the other two cam members 32 and 31 indicating intermediate weights. As a moving car rolls over the treadle hump, each wheel would indicate its load weight as it passes over the center position of the treadle by compressing the treadle 6—7 against the bias of spring 13 and moving downward the crank arm 17 against the bias of spring 21, thus causing a clockwise movement of shaft 18 and a consequent movement of cam and contact members. Assuming the car weight to be evenly distributed on the car wheels, the weight indications given by each wheel would be approximately the same. As, for example in the event that the car was slightly under the average weight, cam member 33 would operate its contact member 37 and give an indication and cam member 32 would also operate its contact member 36 and give an indication. As the operation of contact member 36 indicated the greatest wheel load to pass over the treadle 6—7, this is the indication to be used and by means of certain other apparatus (not shown), this information is used to condition the car retarder so that the proper amount of braking, in accordance with the weight of the car, will be applied to the car wheels as it passes through the car retarder. Similarly, if a fully loaded maximum weight car passed over the treadle 6—7, all of the cam members and their associated contact members would operate so that the indication given by cam member 30 and its associated contact member 34, which indicates the greatest wheel load, would be the indication used to apply the maximum amount of braking to the car wheels as it passes through the car retarder.

As another example, let us assume that a car adapted to be classified is fully loaded at one end while the other end is empty. In this instance, the car wheels on the track under the empty end of the car would only depress the treadle 6—7 slightly and operate cam member 33 and its associated contact member 37 which would indicate a light wheel load. The wheels on the other track under the fully loaded end of the car would probably operate additional cam members 32 and 31 and their associated contact members 36 and 35, indicating a heavier wheel load. The ultimate operation of cam member 31 and contact member 35 would indicate that the car was better than average weight and the proper amount of braking would be applied to the car wheels as previously explained.

Referring now to the other form of the invention as shown in Figs. 7 to 12 inclusive of the drawings, there has been illustrated the usual rail 1 of a standard railroad track which rests on tie plates 2 and ties 3 and all are secured together by the bolts 4 in the usual way. The rail head is cut away as shown at 5 to allow space for mounting the treadle 60 and its associated structure.

In this modified form of the invention, the treadle 60 is comprised of only one part and is pivoted at its right hand end on a bolt 61 which is anchored at one end to the center section of the rail 1. The remaining part of the bolt 61 passes through a hole in the treadle 60 and a bearing bracket 62 which supports the bolt 61 and maintains its alignment. The bracket 62 is welded to, and forms an integral part of, the tie plate 2. The left hand free end of the treadle 60 carries an adjusting screw 63 which cooperates with the plunger part of a circuit controller CC1 for a purpose to be explained hereinafter.

The top face of the treadle 60 is formed with an inclined surface which tapers down toward each end of the treadle from a point 64 located near the free end of the treadle, so that, when the treadle is positioned in its normal position as shown, the high point 64 extends above the head of the rail 1 and the pivoted end is flush with the head of the rail 1. Directly below the high point 64, the treadle 60 has a downwardly projecting arm 65 which has its lower end enlarged and bifurcated so that it terminates into two forks 66 and 67, each fork being tapered and rounded at its extreme lower end to form a pivot bearing point 68. These pivot points 68 rest in a groove or socket in the cover of a dash pot device DP.

As previously mentioned, the dash pot device DP is employed in this form of the invention to arrest the return movement of the treadle 60 after it has been depressed by a car wheel passing thereover. This dash pot device DP is in the form of a sealed housing having a casing 69 and a cover 70 bolted together, the housing being filled with the proper type of fluid, such as a hydraulic fluid. Also within the dash pot housing DP is a piston 71 having its connecting rod 72 extending through the top of the cover 70, the hole in the cover being properly packed to prevent leakage. Located around the rod 72 and between the piston 71 and the cover 70 is a heavy compression spring 73, capable of sustaining the wheel load of a railway car. The casing 69 is provided with a restricted port 74 while the piston 71 is provided with a plurality of ports, two of which are shown at 75. The port 74 is restricted by means of an adjustable screw type valve 78 while the flow through the piston ports 75 is blocked in one direction by means of a plate 76 which is spring pressed against the port openings by a spring 77 and held in place by a washer and pin on the piston 71, flow in the other direction being permitted by means of the pressure exerted against the bias of spring 77.

The dash pot device DP is supported by or suspended from a supporting bracket 80 by its own piston rod 72 and a block or saddle 81. The piston rod 72 is threaded into the saddle block 81 and held in place by a lock nut 82. As more clearly shown in Figs. 8 and 10, the supporting bracket 80 is hollowed out at its center portion to allow passage for the piston rod 72 and the lower portion of the saddle block 81. The saddle block 81 is T-shaped, the lower body portion lying between the two sides of the supporting bracket 80 while the upper body portion has its two projecting lugs 81a straddling the two sides of the supporting bracket 80. As shown at 83 (see Fig. 8), the two upper sides of the supporting bracket 80 are formed with arcuate humps at their center sections while the projecting lugs 81a of the saddle block 81 are formed with arcuate depressions on their lower sides so that a fulcrum point exists at 83 whereby the saddle block 81 and its associated piston rod 72 etc. are pivotally mounted on the supporting bracket 80. This supporting bracket 80 rests upon the auxiliary ties 84 and is fastened to the tie plates 2 by frame structures 85 which are welded in place. An adjustable set screw 86 is threaded into a projecting lug 87 on the treadle arm 65 and the head of this set screw 65 bears against the underside of the rail 1. The purpose of this set screw 86 is to limit the upward normal position of the treadle 60 against the bias of the compression spring 73.

From the description already given and with reference to the drawings, it will be seen that the wheels of a car moving along the rail 1 would, when it reaches the treadle 60, leave the rail head and ride on the upper surface of the treadle 60. As it reaches the high point 64 on the treadle incline, the full wheel load would depress the treadle a certain distance in accordance with its weight. This distance of travel of the treadle 60 would cause the treadle arm 65 and the dash pot housing DP to move downward an equal distance. As the dash pot piston 71 is held secure so far as vertical movement is concerned by reason of its suspension from the stationary supporting bracket 80, the amount of downward movement of the treadle 60 is confined to the reaction of the wheel load against the bias of the compression spring 73, this compression spring 73 being located between the bottom of the dash pot cover 70 and the top of the piston 71.

The downward movement of the treadle 60 is fairly rapid as the fluid in the upper chamber of the dash pot housing DP is allowed to escape through the ports 74 and 75 to the lower dash pot chamber on the underside of the piston 71. However, when the wheel load is removed from the treadle 60 and the compression spring 73 attempts to return the treadle 60 and its associated ports to normal, the piston 71 must force all the fluid in the lower chamber back through the port 74 and into the upper chamber by reason of the fact that the spring pressed plate 76 is sealing off the ports 75. This naturally causes a retarded return of the treadle 60 to its normal position as determined by the set screw 86, and prevents the spring 73 from snapping the treadle 60 and its associated ports back into normal position with the resultant possibility of broken or damaged parts.

Referring now to the indicating means employed in this form of the invention, as previously mentioned, the outer free end of the treadle 60 is equipped with an adjustable bolt 63, the head of which bears against a plunger 90 associated with a circuit controller CC1. This circuit controller CC1 is mounted on a T beam 91 which is secured to the box frame 85 by welding, and is shown in detail in Figs. 11 and 12 of the drawings.

Figure 11:
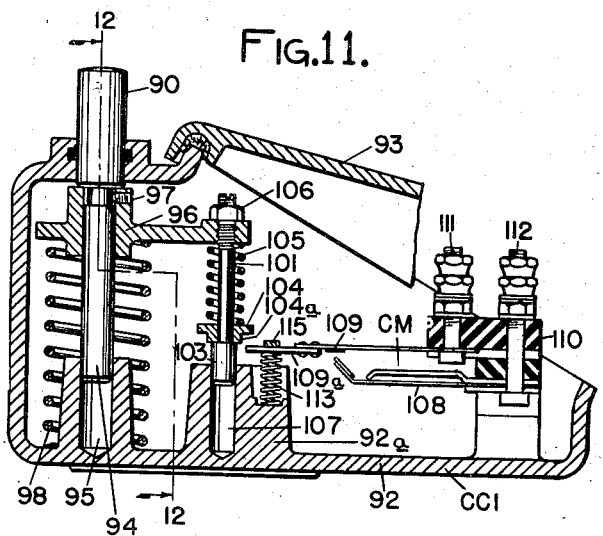
Fig. 11 is a sectional view in side elevation of a circuit controller which is plunger operated by the treadle.

Primarily, the circuit controller CC1 comprises a casing 92 and a moisture proof cover 93 with the plunger 90 entering the housing from the top part of the casing 92 (see Fig. 11). The plunger 90 is suitably packed and sealed against moisture and diminishes in diameter after entering the housing and the lower end 94 is guided in a hole 95 located in a boss in the bottom of the casing 92, to maintain proper alignment. An operating arm 96 is carried by the plunger 90 and is fastened thereto by means of a set screw 97. A compression spring 98 is located on the plunger 90 and is situated between the arm 96 and the bottom of the casing 92, the spring 98 holding the plunger 90 in its normal position wherein it bears against the adjusting bolt 63 (see Fig. 8).

The operating arm 96 carries three other plungers 100, 101 and 102 which are located at the outer end of the arm 96, and are the means of operating their associated contact members CM, only one of which has been shown in Fig. 11. These three plungers, as for example, 101, are each comprised of a rod having an enlarged portion 103 at its lower end which forms a shoulder thereon, and a threaded portion which has a screw driver slot therein at its upper end. When assembled to the operating arm 96, a collar 104 and a compression spring 105 are placed over the reduced portion of the rod so that the collar 104 bears against the shoulder formed by the enlarged portion 103. The smaller threaded end is then threaded into the operating arm 96 and is held in place by a lock nut 106, the spring 105 being trapped between the operating arm 96 and the collar 104. The lower enlarged portion 103 is guided in a hole 107 located in a boss 92a in the bottom of the casing 92. The contact member CM which cooperates with plunger 101 comprises a stationary contact finger 108 and a movable contact finger 109, both contact fingers being suitably fastened to an insulated block 110 by means of binding posts 111 and 112, the block 110 being secured to the casing 92 in some suitable manner. The movable contact finger 109 is biased to its open position by a spring 113.

This circuit controller CC1 assembly as just described provides a structure whereby, when the plunger 90 is depressed by the action of treadle 60, the arm 96 is moved downward and carries the three contact operating plungers along with it. As shown in connection with the plunger 101, as the plunger moves downward the collar 104 will bear against the movable contact finger 109 and cause it to make contact with its cooperating stationary contact finger 108, thereby establishing a circuit to be used for indication purposes. As previously mentioned, the collar 104 is spring biased to its normal position by spring 105 and the movable contact finger is also spring biased to its normal position by a spring 113. This is for the purpose of preventing damage to the various parts in instances where the movement of the plungers 100, 101 or 102 continues on downward after their contacts 108 and 109 have made contact, as will be explained hereinafter. The compression spring 98 returns the plunger 90 and its associated operating arm 96 and plungers 100, 101 and 102 to their normal positions as soon as the treadle 60 returns to its normal position after the wheel load has been removed therefrom.

Referring now to the operation of the device as described in connection with this modified form of the invention, the indications given by the closed contacts of the three contact members CM will be utilized in the same manner as previously described in connection with the first form of the invention, that is, to precondition the setting of the car retarders so that the proper amount of braking will be applied to the cars in accordance with their weight as they pass therethrough. In this form of the invention, the closing of one contact member CM by its associated contact plunger 102 will indicate a light wheel load, the closing of another contact member CM by its associated contact plunger 101 will indicate a medium wheel load while the closing of the third contact member CM by its associated contact plunger 100 will indicate that a heavy wheel load is passing over the treadle 60. In this connection it will be seen by referring to Fig. 11 of the drawings that plunger 101, which indicates a medium wheel load, must move downward a specified distance, say about one-quarter of an inch as determined by actual practice, before the collar 104 contacts the tip of contact finger 109 and causes it to make contact with contact finger 108. This one-quarter inch movement is initially defined by the location of the collar 104 on the plunger 101 as determined by the length of the shoulder portion 103. The distance can then be finally set by adjustment of the plunger 101 in the arm 96, after which it is locked in place by the lock nut 106.

Figure 12:
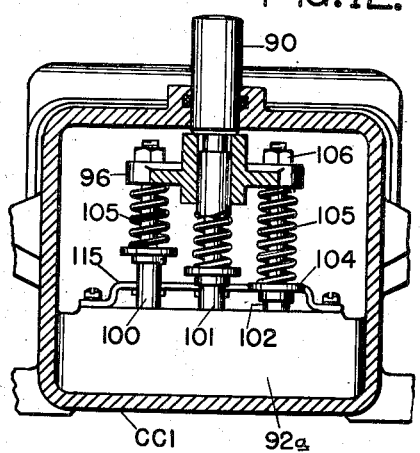
Fig. 12 is an end sectional view of the circuit controller, taken on the line 12—12 of Fig. 11.

The initial location of the collar 104 on the plunger 102 (see Fig. 12), which is used for indicating a light wheel load, must necessarily be closer to its cooperating contact member CM because with a light wheel load on the treadle 60 its downward movement is less and consequently less travel of the plunger 102 must operate its associated contact member to cause it to indicate a light wheel load. As shown in Fig. 12, this necessitates a shorter shoulder portion 103 and a longer compression spring 105. By the same token, the plunger 100, which indicates a heavy wheel load, must have its collar located a greater distance from its cooperating contact member CM, and this requires a longer shoulder portion 103 and a shorter compression spring 105. The required distance of opearting travel of both plungers 100 and 102 can be adjusted in a manner similar to that described in connection with plunger 101.

Assuming that a heavily loaded car is passing over the detector device, the treadle 60 would be depressed the maximum amount and this in turn would operate the circuit controller CC1 by depressing the plunger 90, the operating arm 96 and its associated contact operating plungers 100, 101 and 102. As a heavy wheel load has passed over the treadle 60, all contact operating plungers 100, 101 and 102 would be depressed the full limit and operate their associated contact members CM, the last plunger to operate its contact being plunger 100, which plunger indiactes a heavy wheel load and would be the one used to govern the setting of the car retarder. However, plunger 102 was the first to operate its contact and plunger 101 was next, with the result that these two plungers are pushed well past their operating points. Shortly after the collars 104 on these two plungers 101 and 102 make contact with their respective contact fingers 109, their movement is stopped by the shoulder portions 104a of the collars 104 abutting against the upstanding boss 92a in the casing 92 as can be best seen in Fig. 11. As the plungers 101 and 102 continue to move downward because the weight of the car is sufficient to continue the compression of spring 98, the springs 105 on plungers 101 and 102 are merely further compressed between the collars 104 and the arm 96. Since the lower portions 104a of the collars 104 are thicker than the protrudinng ends 109a of the contact fingers 109, the respective springs 113 merely hold the ends of the fingers 109 against the collars 104, and these ends of the fingers are not squeezed between the collars 104 and the upwardly extending boss 92a of the casing 92. This is desirable because these extending ends 109a the contact fingers are preferably of suitable insulating material.

It should also be noted that the springs 113 tend to hold the extending portions 109a of the contact fingers 109 against an upper limiting bracket 115 to maintain such contacts normally open with respect to the stationary contact fingers 108. In this way, the different positions of the collars 104 on their respective plungers determine the extent to which the spring 98 must be compressed in order to close their respective contacts. The positions of each collar 104 can be adjusted by loosening the appropriate nut 106 and screwing the corresponding plunger 100, 101 or 102 up or down as the case may be and then locking it by tightening the nut 106. But regardless of the position of the collars, they operate their respective contacts the same amount when the proper weight is present, and the presence of a greater weight in no way acts adversely upon the contacts because of the compression of the springs 105.

In view of the complete operational description given above in connection with the first form of the invention as to how the car weights are determined and indications given, it is believed unnecessary to review the matter again in connection with this form of the invention.

It should be understood that the two forms of the invention shown and described are merely illustrative and that the weight detector device could employ other forms of treadle arrangements and other combinations of contact arrangements whereby either more or less indications would be transmitted as the particular installation would require. Also, other indicating means could be employed and the device could be used for detecting the weight of moving objects or vehicles other than railroad cars.

Having thus shown and described two forms which the invention may assume, it is desired to be understood that various other modifications could be made without departing from the spirit or scope of the invention as defined in the appended claims.

What I claim is:

1. In a car weight detector for railroads, a treadle located adjacent and parallel to a track rail, said treadle having an arcuate top surface and being pivotally supported at one end, a coil spring resiliently supporting said treadle near its other end, said coil spring maintaining said arcuate top surface of said treadle above the top surface of said track rail and being capable of supporting the load weight of a car wheel, a housing for said coil spring, said coil spring being located within said housing and situated between a stationary support and the top of said housing which cooperates with said treadle, said housing being filled with oil and provided with passages to form an oil dashpot, a multiple position contactor having a spring biased plunger which cooperates with said other end of said treadle, said spring biased plunger cooperating with multiple contacts; whereby, each of said car wheels moving over said treadle will quickly depress said treadle against the resistance of said coil spring a distance determined by its load weight to thereby effect the closing of certain of said multiple contacts which indicate said car wheel load weight, said coil spring slowly returning said treadle toward normal after each car wheel passes thereover, said oil dashpot regulating the quick depression and slow return of said treadle.

2. A car weight detector for weighing moving railroad cars comprising, a treadle located adjacent and parallel to one of the railroad track rails and positioned to permit car wheels to ride over it, said treadle having an arcuate top surface and being pivotally mounted at one end, a coil spring resiliently supporting said treadle near its other end to maintain said arcuate top surface a limited distance above the top of said track rail, said coil spring being capable of maintaining said arcuate top surface a slight distance above the top of said track rail even when depressed by the heaviest car wheel load weight, a housing for said coil spring, a downwardly projecting arm on said treadle which bears against the top of said housing forming a fulcrum support for said treadle, said housing also containing oil, a piston and a piston rod which extends through the top of said housing and is pivotally supported on a stationary saddle, said coil spring being compressed between said piston and the top of said housing, said piston and said housing being provided with restricted ports to control the passage of said oil, a multiple position contactor having a spring biased plunger which bears against a stop on said other end of said treadle, said spring biased plunger carrying an arm which cooperates with a plurality of contact operating plungers each of which closes a contact after being depressed a predetermined distance, each of said contact operating plungers comprising a spring biased contact operating member and an adjusting means to predetermine the contact operating distance and a stop to limit the overall movement of said contact operating member, each of said contacts being spring biased to an open position against a stop; whereby, each of said car wheels passing over said treadle will depress said treadle, said housing, said coil spring, and said spring biased plunger in accordance with the load weight on each of said car wheels, causing oil to be quickly forced from the upper side to the lower side of said piston and allowing downward movement of said contact operating plungers to close said contacts and indicate the load weight on each of said car wheels, said compressed coil spring slowly returning said treadle and associated parts to normal after each of said car wheels has passed over said treadle, said return of said treadle being retarded by the restricted return of said oil from the bottom of said piston to the top of said piston.

References Cited in the file of this patent

UNITED STATES PATENTS

| 443,731 | Steele | Dec. 30, 1890 |
| 756,208 | Bugler | Apr. 5, 1904 |
| 1,626,920 | Coleman | May 3, 1927 |
| 2,475,685 | Williams | July 12, 1949 |
| 2,551,754 | Meredith | May 8, 1951 |
| 2,779,583 | Bone | Jan. 29, 1957 |

FOREIGN PATENTS

| 386,960 | Germany | Dec. 22, 1923 |
| 394,880 | Germany | May 8, 1924 |
| 116,494 | Switzerland | Sept. 1, 1926 |